Oct. 30, 1928.
E. ASTOLA
1,689,192
AGRICULTURAL MACHINE
Filed March 15, 1924
3 Sheets-Sheet 2
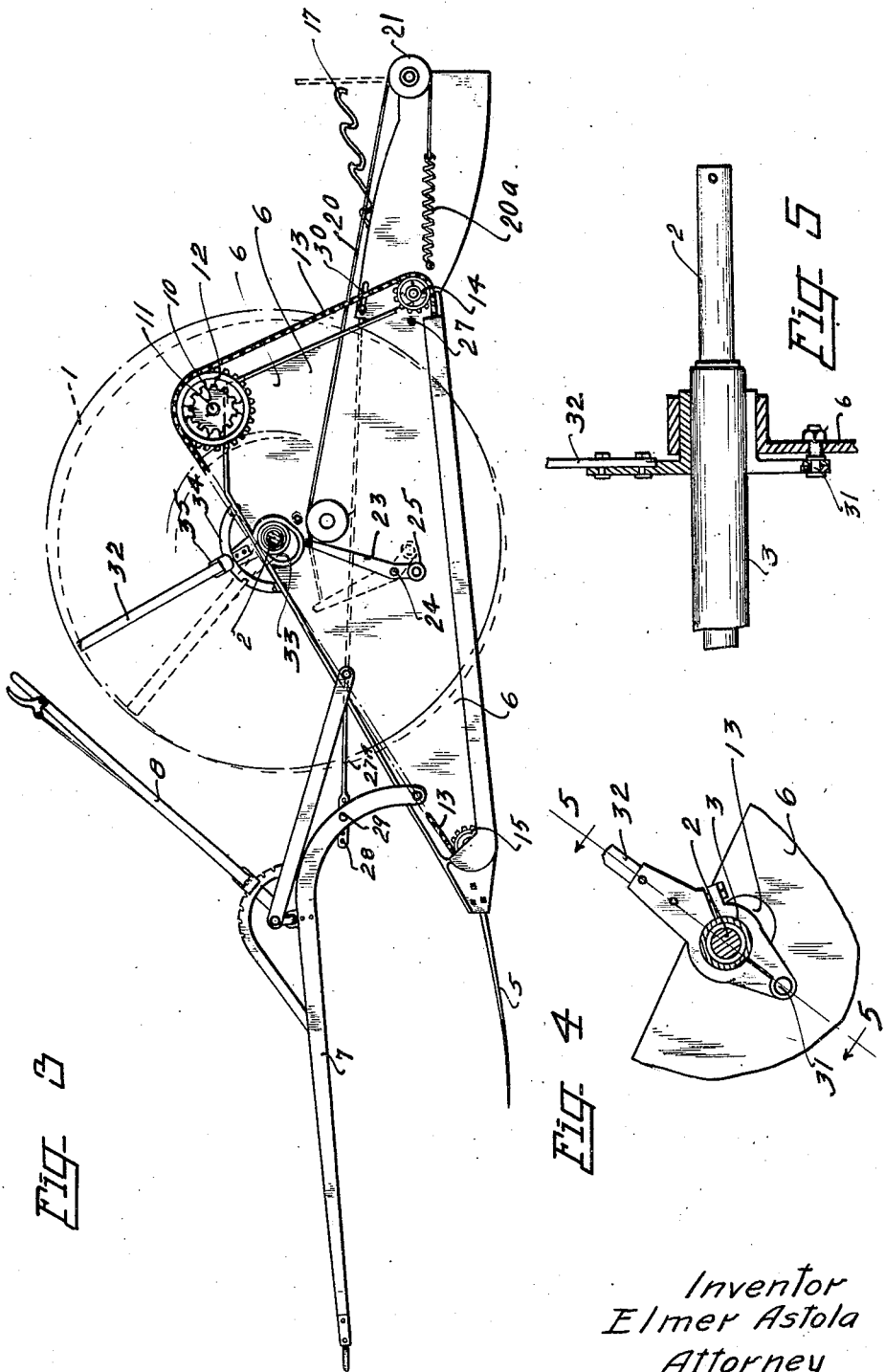
Inventor
Elmer Astola
Attorney Oct. 30, 1928.
E. ASTOLA
AGRICULTURAL MACHINE
Filed March 15, 1924
1,689,192
3 Sheets-Sheet 3
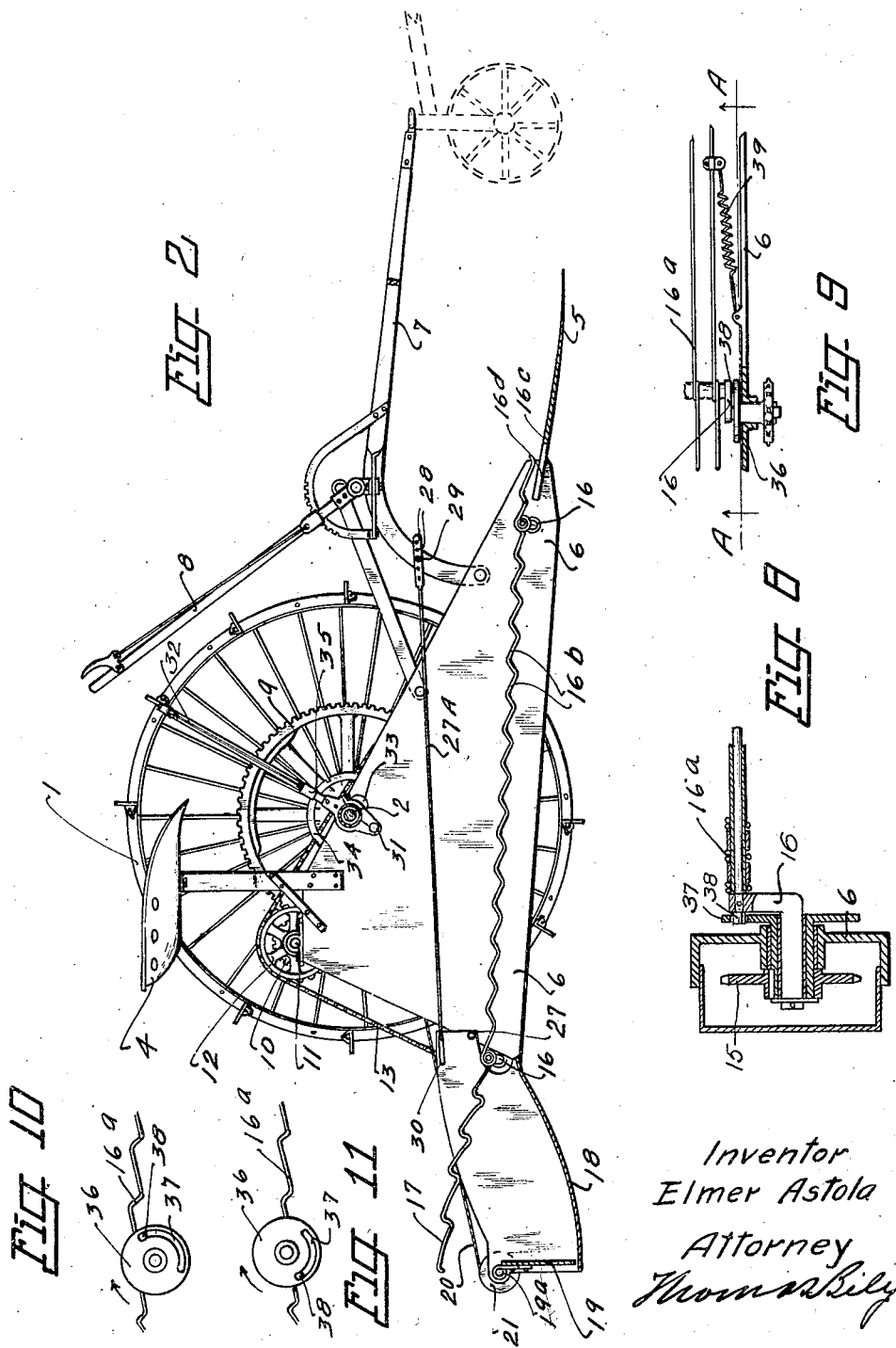
Inventor
Elmer Astola
Attorney Patented Oct. 30, 1928.

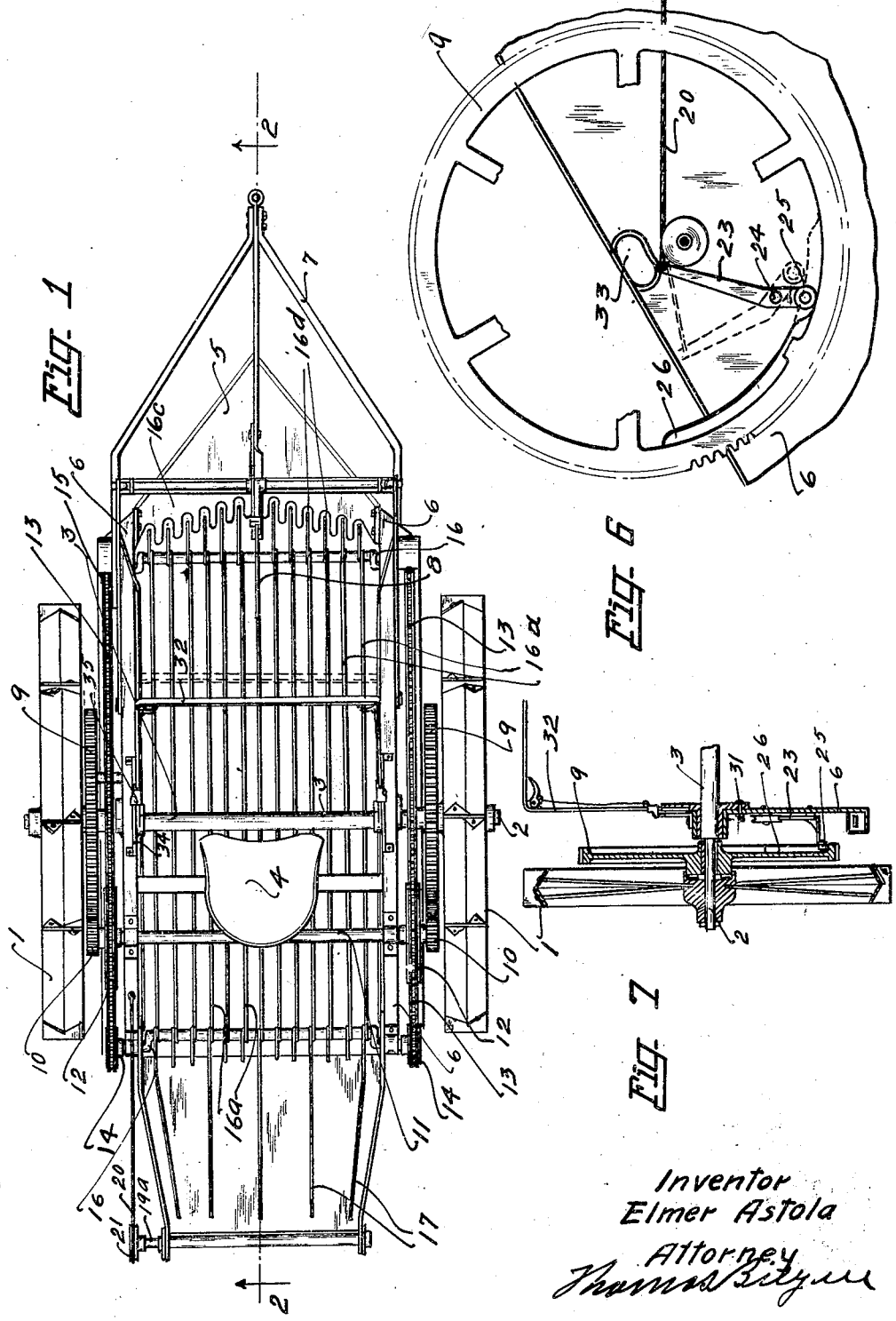

1,689,192

UNITED STATES PATENT OFFICE.

ELMER ASTOLA, OF DEEP RIVER, WASHINGTON.

AGRICULTURAL MACHINE.

Application filed March 15, 1924. Serial No. 699,440.

The invention relates to a power propelled agricultural machine and the same consists of new and novel means for the operating of the same. My invention is particularly useful for digging potatoes and is of simple construction, affords ease of operation, has but few parts to get out of order and enables the operator to dig the potatoes, separate the same from the soil and clods, permits the vines and like material to be carried away from the potatoes and lastly makes possible the depositing of the potatoes in piles at regular intervals.

Further, a new and novel result in my invention is accomplished by a new and novel quick action, of the sorting screen; such that as the digger moves forward, the sorting screen has imparted to it, longitudinally a quick motion, which enables the same to retain the potatoes deposited thereupon and at the same time to cause the same to move rearward to discharge into a receptacle which is intermittently dumped.

The invention consists further in a new and novel arrangement of parts to be hereinafter described and to be claimed in the claims appended to this specification.

Reference is made to the accompanying drawings, in which—

Fig. 1 is a plan view of the assembled potato digger. Fig. 2 is a side elevation and partial section view of the same. Fig. 3 is a partial section view of the potato digger looking in the opposite direction from that shown in Fig. 2.

Fig. 4 is an enlarged and partial section view of the shift lever mechanism. Fig. 5 is a section view of the mechanism shown in Fig. 4 taken on line 5—5 looking in the direction indicated by the arrows. Fig. 6 is a side and detached view of the tripping mechanism for opening the closure for the hopper. Fig. 7 is a section view of the driving wheel and the tripping mechanism for the hopper closure. Fig. 8 is a section view of the driving crank and sprocket for raising and lowering the screen. Fig. 9 is a plan view of the mechanism for transmitting the quick motion to the screen. Fig. 10 is a side view of the driving cam that makes possible the quick motion to be transmitted to the screen, showing the same before it has been tripped and in Fig. 11 the same mechanism is shown after the trip has occurred, the mechanism in Fig. 10 and Fig. 11 being shown as seen in the direction indicated by the arrows on line A—A of Fig. 9.

Similar reference characters refer to similar parts throughout the several views.

The main supporting and driving wheels 1 are journaled about axles 2 and to protect the same and to make the machine more rigid a pipe covering 3 is employed. The seat 4 is secured to the side frame members 6, and the shovel 5 is also secured to the side frame members 6. A draft tongue 7 is provided and the same may be of a form suitable for animal or other power application. A control lever 8 is provided for regulating the depth that the shovel may be made to go or it may be used to prevent the shovel from engagement with the ground altogether. Driving gears 9 are attached to the driving axle 2 and these driving gears mesh with, and drive the pinions 10 which are secured to the shaft 11. Secured to the shaft 11 are sprockets 12 and about which the chain 13 is made to pass and which is driven thereby. The chain 13 passes around sprockets 14 and 15 and cause the same to rotate as the chain is driven. The sprockets 14 and 15 are loosely secured upon the crank shafts 16, one of which is located at each end of the frame. The same run from side to side and are supported at each end.

Running transversely of the main frame and in a horizontal position are screen members $16^a$ which have wave like contours as is indicated at $16^b$. These individual members $16^a$ are secured directly to the crank shafts in such manner as to permit the rotation of the crank shafts, and in so doing the screen mechanism is raised and lowered at each revolution of the crank arms, the object being to create a movement that will make possible the clearing of the screen of undesirable materials such as stones, clods, weeds, and the vines of the potatoes. Disposed rearwardly of the shovel is a member $16^c$ having a series of corrugated openings $16^d$ through which the screen members pass in their up and down movement, the object being that as the shoveled material moves up the mould board of the shovel it will be deposited upon the screen and all of the fine material will fall through the wave like screen and be redeposited upon the ground and in the path of travel of the machine.

Disposed rearward of the screens are a series of tines 17 that are for the purpose of carrying the weeds and vines over and past the hopper 18 into which the potatoes are deposited as they fall from the rear portion of the screen. The bottom of the hopper is sloped rearwardly in order that the deposited potatoes will gravitate to the rear of the hopper. A hinged closure plate 19 serves as a gate at the rear of the hopper, and the opening of the closure at intervals in the travel of the potato digger will deposit the collected potatoes from the hopper in piles. The closure plate is secured to a shaft 19ª having a grooved pulley attached thereto shown at 21 and passing around the grooved pulley 21 is a flexible cable 20. After the flexible cable passes around the grooved pulley the same terminates and is secured to a flexible tension spring 20ª that maintains a tension in the cable 20. The cable, at its opposite end is attached to a bell crank 23 which is pivoted about the pin 24 and has a roller bearing 25 on its lower end. The tension in the cable tends to pull the bell crank into the full line position as shown in Fig. 6 which causes the roller at the lower end of the same to engage with and contact with the inner periphery of the driving gear. A cam shoe 26 is also on the inner periphery of the gear and as the roller 25 engages with the shoe it forces the bell crank to move to the position of the dotted lines as shown in Fig. 6. This causes the grooved pulley 21 to rotate and as the same is secured to the shaft 19ª the closure plate 19 is raised and the accumulated and deposited potatoes that are in the hopper are permitted to flow therefrom in a pile.

As soon as the roller passes over the shoe upon the inner periphery of the gear the spring causes the roller to again occupy its normal position and the closure is lowered to its normal position of being closed and the same remains in that position until one full revolution of the gear is made at which time the cycle of operation will again be made of the opening and closing of the closure as heretofore described. To make the hopper flexible and capable of being raised or lowered to a desired angle it is hinged about rod 27 and at the same time has adjustable control rod 27ª attached thereto, which in turn is attached to the arched part of the draft tongue 7. The forward end of the control rod has a series of holes 28 therein and is made fast to the member 7 by means of pin 29, and to permit of flexibility between the control rod and the hopper a slot 30 is provided. This slot is to provide a flexibility in the hopper so that as the same passes over an uneven surface in the path of travel the rearward end of the same that contacts with the ground may be made to rise a sufficient amount to pass over the obstruction.

When the potato digger is being transported from one potato field to another, or from one place of use to another it is desirable that the movement of the screen shall be discontinued. This is accomplished by the disengagement of the driven pinion from the driving gear. The main frame of the digger is carried upon the pins 31 that connect the throw out lever 32 with the side frame members and the same is carried suspended about the pin 31. The throw out lever is carried in engagement with the quadrant 34 by the connection 35. An opening 33 is made in the side frame members and if it is desired upon the part of the operator to disengage the driven pinion from the driving gear the lever is thrown over and the pinion is moved rearward as shown in the dotted position in Fig. 3, and out of engagement with the driving gear.

It is highly desirable that the screen over which the dug material passes and is deposited upon should have an intensified, or quick motion that will tend to accelerate the rearward movement of the deposited material, and at the same time tend to break up the deposited material and cause the same to pass through the screen. This is accomplished by the mechanism shown in Fig. 9, Fig. 10 and Fig. 11. The sprockets 14 and 15 are driven by the action of the chain 13 passing thereover and as the same is driven the crank shafts 16 are caused to revolve about the center of rotation of the shaft. Disks 36 are secured to the sprockets 14 and 15 and the same have a slot 37 therein in which, a pin 38 disposed upon the crank shafts 16 is made to engage. The shafts are driven against the tension spring 39 and as the pin nears the center line of pull of the spring 39 a tension in the spring is created greater than the driving power of the sprocket required to turn the crank, as soon as the disk passes over the center the spring jerks the crank shafts quickly so that the pin 38 moves to the opposite end of the slot, this is so arranged that the accelerated motion of the screen has a tendency to force the material being held upon the screen to move towards the rear thereof and at the same time has a tendency to free and clean the same of refuse, tops and other undesired matter. This accelerated action is repeated at each revolution of the crank shafts, and carries the vines, weeds, and other undesirable material over the end of the screen. The sprockets 14 and 15 are so connected that the crank shafts 16 will rotate in the same manner and one will not act as a brake on the other.

Having thus described my invention I wish to make the following claims therefor—

1. In an implement of the class described, crank shafts parallelly disposed, screen members mounted on said crank shafts, and means to revolve said crank shafts to impart an accelerated motion thereto during a part of each revolution, comprising driven sprockets loosely mounted on said crank shafts, slotted disks mounted to said sprockets, pins disposed on said crank shafts and engaging the slot in said disks and a tension spring alternately resisting and assisting each revolution of said crank shafts.

2. In an agricultural implement revolvable crank shafts adapted to support a screen member, and means for revolving said crank shafts so that the motion thereof will be accelerated during a part of each revolution, said means comprising driven sprockets loosely mounted on said crank shafts slotted disks mounted to said sprockets, pins carried by said crank shaft and each retained within the slot of a disk, and yieldable means alternately resisting and assisting each revolution of said crank shafts.

3. In an agricultural implement a pair of revolvable crank shafts adapted to support parallel screen members, driven sprockets loosely mounted on said shafts, a disk provided with an arcuate slot, mounted to each sprocket, pins protruding from said crank shafts, each pin extending into a slot in one of said disks, and spring means alternately resisting and assisting each revolution of said crank shafts.

4. In an agricultural implement, parallelly disposed crank shafts upon which are mounted screen members having a wave-like contour, a means for driving said crank shafts so that the motion thereof will be accelerated during a part of each revolution, comprising driven sprockets loosely mounted on said crank shafts, slotted disks mounted to said sprockets, pins mounted on said crank shafts and engaging the slots in said disks, and tension springs alternately resisting and assisting each revolution of said crank shafts; and a collecting and depositing hopper disposed at the rear of said screen.

5. In an agricultural implement, parallelly disposed crank shafts; screen members mounted upon said crank shafts, said screen members having a wave like contour and terminating in the rear in a series of spaced tines, a means for driving said crank shafts so that the motion of said crank shafts will be accelerated during a part of each revolution, said means comprising driven sprockets loosely mounted on said crank shafts, slotted disks mounted to said sprockets, pins mounted on said crank shafts and engaging the slots in said disks, and tension springs alternately resisting and assisting each revolution of said crank shafts; and a collecting and discharging hopper associated with said screen members, disposed below the aforementioned tines.

ELMER ASTOLA.